(12) United States Patent
Kulesz et al.

(10) Patent No.: US 7,049,952 B2
(45) Date of Patent: *May 23, 2006

(54) SYSTEM FOR DETECTION OF HAZARDOUS EVENTS

(75) Inventors: James J. Kulesz, Oak Ridge, TN (US); Brian A. Worley, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 11/084,339

(22) Filed: Mar. 18, 2005

(65) Prior Publication Data

US 2005/0206506 A1 Sep. 22, 2005

Related U.S. Application Data

(63) Continuation of application No. 10/370,913, filed on Feb. 21, 2003, now Pat. No. 6,930,596, which is a continuation-in-part of application No. 10/199,733, filed on Jul. 19, 2002, now abandoned.

(51) Int. Cl.
*G08B 29/00* (2006.01)

(52) U.S. Cl. ............... 340/506; 340/507; 340/508; 340/522; 340/539.1

(58) Field of Classification Search ........... 340/506, 340/507, 508, 522, 539.1, 514, 505
See application file for complete search history.

(56) References Cited

U.S. PATENT DOCUMENTS

| | | | |
|---|---|---|---|
| 5,401,413 A | 3/1995 | Gatt et al. | |
| 5,408,182 A | 4/1995 | Stolarczyk et al. | |
| 5,591,115 A | 1/1997 | Raimondi et al. | |
| 5,724,255 A | 3/1998 | Smith et al. | |
| 6,280,507 B1 | 8/2001 | Walker | |
| 6,485,683 B1 | 11/2002 | Walles | |
| 6,517,594 B1 | 2/2003 | Olander et al. | |
| 6,930,596 B1* | 8/2005 | Kulesz et al. | 340/506 |
| 2002/0044533 A1 | 4/2002 | Bahl et al. | |
| 2003/0136920 A1 | 7/2003 | Flores et al. | |

FOREIGN PATENT DOCUMENTS

WO WO01/26068 4/2001

OTHER PUBLICATIONS

A Frequency-Dependent FDTD Method For Induced-Current Calculations for a Heterogeneous model Of the Human Body—written by O.P. Gandhi, J.Y.chen and C.M. Furse.

* cited by examiner

*Primary Examiner*—Daryl C Pope
(74) *Attorney, Agent, or Firm*—MacMillan, Sobanski & Todd, LLC

(57) ABSTRACT

A system for detecting the occurrence of anomalies, includes a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to query its adjacent nodes to assess the status of the adjacent nodes and the communication links.

33 Claims, 6 Drawing Sheets ered dysfunctional. Graviton's sensors include a low-cost processor, and support a large array of sensor devices. One proposed use for Graviton's system includes homeland security. Multiple sensor nodes communicate bi-directionally, initially to a data hub. The system's modular approach allows applications (data collection, data mining, analysis, actuation) to be distributed throughout the network. Graviton's wireless distributed sensory network involves continually connecting and reconnecting between local points and far flung nodes.

SYSTEM FOR DETECTION OF HAZARDOUS EVENTS

RELATED APPLICATIONS

This application is a Continuation of U.S. patent application Ser. No. 10/370,913, filed Feb. 21, 2003 and now U.S. Pat No. 6,930,596, which is a Continuation-In-Part application of U.S. patent application Ser. No. 10/199,733, filed Jul. 19, 2002, and entitled AUTOMATIC DETECTION AND ASSESSMENT OF CHEMICAL, BIOLOGICAL, RADIOLOGICAL AND NUCLEAR THREATS, now abandoned, all of which is incorporated in the present application in its entirety.

STATEMENT REGARDING FEDERALLY SPONSORED RESEARCH OR DEVELOPMENT

The U.S. Government has certain rights in this invention pursuant to Contract No. DE-AC05-00OR22725 between the U.S. Department of Energy and UT-Battelle, LLC.

TECHNICAL FIELD

This invention relates to a system for the detection of environmental conditions, including hazardous events. More particularly, this invention relates to a system for detecting and assessing environmental events or conditions, and transmitting information about those events or conditions over a communication network.

BACKGROUND OF THE INVENTION

The detection of hazardous events is a useful practice to warn the public as well as to inform safety and security forces as to the existence of the hazardous event. Hazardous events can occur naturally, such as in the case of a hurricane, tornado or earthquake, or can occur through a human event such as in an accidental chemical spill or in a terrorist attack. At the present time there are some early warning systems in place to provide the potentially affected populace and the relevant emergency forces with some advance notice of some disasters. For example, a system of Doppler radar installations in various communities can provide in some cases a timely warning of impending high winds and possible tornadoes. This system is limited to one particular type of anomaly, i.e., high winds, and is only partially effective because it relies on early warning sirens and broadcast media, both of which have limitations, for communication.

U.S. Pat. No. 6,169,476 to Flanagan discloses an early warning system for natural and human initiated disasters. Flanagan's system collects and analyzes data as the disasters occur, and when necessary, transmits early warnings to cause mitigation responses to lessen the disaster's impact on lives and property. The system uses a plurality of sensing, detecting and reporting sources, some of which are automatic and some of which are human originated. A central processing site receives this data and determines the type, magnitude, speed, direction and expected geographic area to be affected by the anomaly. A plurality of cell relays is disposed across a geographic area covered by the system. Once the central processing apparatus receives the data from the sensors and assesses the likely or potential outcome, a warning signal is transmitted to selected cell relays for re-broadcast to the intended receivers, which could include television, radio, cell phones, pagers, and various types of alarms. The system determines which cell relays will receive the warning signals based on the expected geographic area to be affected by the disaster, thereby only alerting those in the projected path of the threat.

Graviton, Inc. of La Jolla, Calif. has proposed an end-to-end wireless sensing and network system that provides a self-organizing and self-healing capability so that the system could survive and continue to function even if certain sensors were rendered dysfunctional. Graviton's sensors include a low-cost processor, and support a large array of sensor devices. One proposed use for Graviton's system includes homeland security. Multiple sensor nodes communicate bi-directionally, initially to a data hub. The system's modular approach allows applications (data collection, data mining, analysis, actuation) to be distributed throughout the network. Graviton's wireless distributed sensory network involves continually connecting and reconnecting between local points and far flung nodes.

Hansler in U.S. Pat. No. 5,831,526 discloses a network of hazard detectors where each detector communicates a locally hazardous condition to multiple neighboring detectors using radio frequency (RF) signals. Hansler's primary embodiment involves multiple smoke alarms in a building.

Improved communication systems for hazardous or environmental anomalies can be useful in the management of the safety and security of buildings, as well in the transportation industry. Also, better network communications would be useful in the area of process controls for such commercial and industrial areas as manufacturing, utilities and infrastructure monitoring.

It would be advantageous if there could be developed an improved sensor network and communication system.

SUMMARY OF THE INVENTION

The above objects as well as other objects not specifically enumerated are achieved by a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to query its adjacent nodes to assess the status of the adjacent nodes and the communication links.

According to this invention there is also provided system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller has memory storage, and each controller transmits data to an adjacent node, wherein the controller of the adjacent node stores the transmitted data in the memory of the adjacent node.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to send commands to one or more adjacent nodes upon the detection of predetermined anomalies by its associated sensors.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller, when an anomaly is detected, is programmed to query its adjacent nodes to assess detection by the adjacent nodes, and upon corroboration of the anomaly by an adjacent node, the controller is programmed to transmit a signal indicative of the detection of the anomaly.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to analyze the data from its associated sensors and form a prediction of a consequence of the data from its associated sensors.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. At least one of the associated sensors of a node is configured to sense a condition related to a security threat, and at least one of the sensors of the node is configured to sense a non-security threatening condition.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network, wherein the communication links are formed of a primary mode of communication and a secondary mode of communication. Each controller is programmed to assess the status of the communication links. Each controller is programmed to switch from the primary mode of communication to the secondary mode of communication upon detection of a failure of the primary mode of communication.

According to this invention there is also provided a system for detecting the occurrence of anomalies, including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to determine a point of origin of a detected anomaly.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to change its operation upon the occurrence of any one or more event in the group consisting of the detection of an anomaly, the destruction of a communication link to an adjacent node, a loss of power from a primary source of power, a loss of controller capability, a decrease in capability of a processor, a decrease in the capability of memory storage, and a command from another node.

According to this invention there is also provided a system for detecting the occurrence of anomalies, the system including a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to deploy sensors, or nodes, or both sensors and nodes from the node in response to the detection of an anomaly.

According to this invention there is also provided a control system for monitoring process conditions, the system including a plurality of spaced apart nodes, with each node having adjacent nodes, each of the nodes having one or more sensors associated with the node and capable of assessing process conditions, and each of the nodes having a controller connected to the sensors associated with the node. The system also includes communication links between adjacent nodes. The nodes form a network. Each controller is programmed to query its adjacent nodes to assess the status of the adjacent nodes and the communication links.

Various objects and advantages of this invention will become apparent to those skilled in the art from the following detailed description of the preferred embodiment, when read in light of the accompanying drawings.

DETAILED DESCRIPTION OF THE INVENTION

Figure 1:
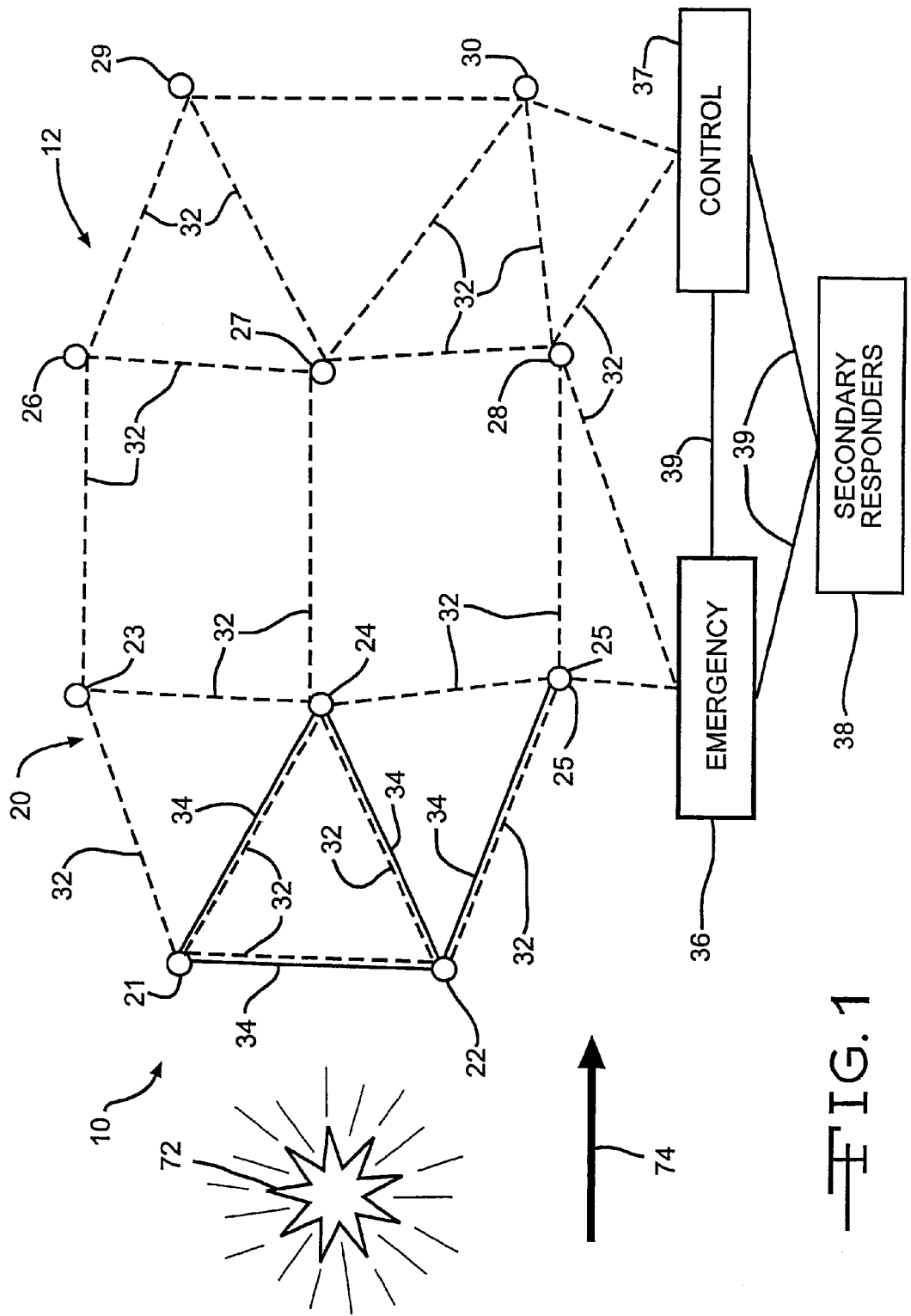
FIG. 1 is a schematic plan view of a plurality of sensor nodes forming a network according to the system of the invention.

FIG. 1 illustrates a system for detecting the occurrence of anomalies according to the invention. The system, indicated generally at 10, includes a network 12 consisting of a plurality of spaced apart nodes, indicated generally at 20, and more specifically at 21–30. Each node 20 has adjacent nodes, with adjacent nodes 20 being connected by links 32. The term "adjacent node" means any node 20 within the network 12. Preferably, adjacent nodes are the next nearest nodes in the network. As will be explained in greater detail below, each of the nodes 20 has one or more sensors associated with the node and capable of detecting anomalies. The links 32 are wireless links, such as radio frequency (RF) signals transmitted and received between adjacent nodes 20, that tie the nodes 20 together to form the network 12. While wireless links 32 are illustrated in FIG. 1, other communication modes between nodes 20 can be used in conjunction with the invention. For example, hard wire connections and satellite relays can be used. Hardwire links 34 are indicated among nodes 21–25 in FIG. 1. Internet connections can also be used.

The nodes 20 forming the network 12 can be positioned in spaced apart locations throughout the geographic area to be protected by the system of the invention. In order to protect the largest number of people, a network will be placed within large population centers, such as within metropolitan areas. The nodes can be physically located at any location, but are preferably positioned in an elevated location, such as on top of tall buildings, on tall bridges, on hillsides, or, most preferably, on existing communication towers, such as radio towers or cellular telephone towers. It is to be understood that for various reasons, such as, for example, for the detection of anomalies other than airborne hazards, nodes can be placed at ground level, within buildings and other human-made structures, and at other non-elevated locations. Optionally, the nodes can be positioned at different vertical elevations, or have their sensors positioned at different heights to provide a vertical assessment of hazardous conditions. This can be accomplished in several ways, including using towers and balloons.

In a preferred embodiment of the invention, the network 12 of linked nodes 20 is connected to an emergency response system, indicated schematically at 36. The emergency response system 36 acts in response to notification from any of the sensors 20 that threshold detection of a hazardous substance has been detected. The emergency response system can include any of the conventional first responders for emergencies, such as police, firefighters, rescue squads and first aid teams. The emergency response system could also include, as appropriate, other responders, such as military responders, experts in chemical, biological, nuclear, and radiological hazardous materials, and antiterrorist personnel, as well as additional responders germane to the situation involved. Other types of primary responders will be apparent to those skilled in the art.

A control and command center, indicated schematically at 37 is also connected to the network 12 to enable emergency authorities to control the efforts of various responders, and to handle such issues as media interface.

Depending on the circumstances, there may be a need for secondary responders, indicated schematically at 38, including such responders as evacuation personnel, decontamination teams, clean-up crews. Other types of secondary responders will be apparent to those skilled in the art.

The emergency response system 36, the control and command center 37, and the secondary response system 38 can be linked together by any suitable means, such as communication links 39. The communications among the nodes 20 for some or all of the signals sent by the nodes can optionally be encrypted for additional security. Also, the communications to and from the control and command center can be divided in any suitable manner, such as by segregating military communications from civilian communications. In this respect, the system of the invention allows distributed access with multi-level security, and is scalable across federal, state and local governments.

Figure 2:
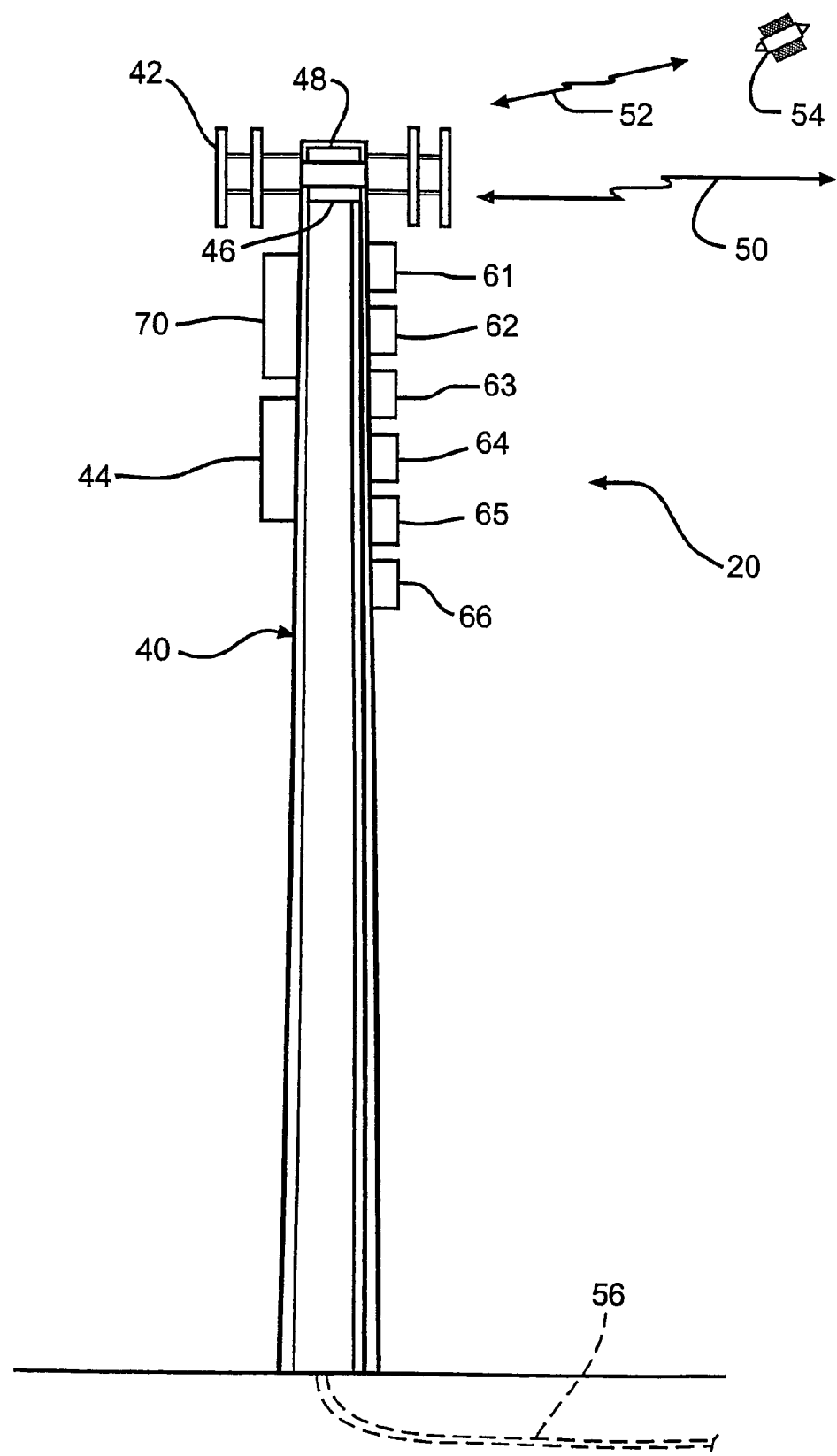
FIG. 2 is a schematic elevational view of a cell tower that supports a node of the invention.

An example of a preferred node 20 is shown in FIG. 2, where a cell tower 40 includes an antenna 42. The cell tower 40 is supplied with electric power by a means, not shown, and preferably includes an auxiliary power source 44 for use when the primary supply is cut off. The cell tower 40 includes a transmitter 46 and a receiver 48 for transmitting information to other nodes 20 within the network 12. The communication to adjacent nodes can be by any means, such as by radio waves 50 to an adjacent cell tower, not shown, or by radio waves 52 to a satellite 54 and then to a different node, or by a hardwire connection 56 to an adjacent tower, not shown. Optical communication modes can also be used.

The tower 40 includes at least one and preferably a plurality of sensors, indicated generally at 60. The sensors illustrated include a sensor 61 for sensing chemical hazards, a sensor 62 for sensing biological hazards, a sensor 63 for sensing nuclear hazards, a sensor 64 for sensing radiological hazards, and a sensor 65 for sensing explosive hazards. Sensors for detecting the presence of other substances can be used. The media sampled by the sensors can be gaseous (e.g. air), liquid or solid. Some of the sensors can be combined into one apparatus, such as a combination chemical/biological mass spectrometer (CBMS). There are many different types of sensors that can be used for the sensors 60, as would be well known to those skilled in the art. One of the advantages of the system of the invention is that different sensors can be plugged in to the system 10, i.e., installed at a node 20, and incorporated into the control scheme of the system 10. In order to ensure compatibility, it is preferred that all the sensors 60 meet an industry standard bus structure, such as RS-232 or, preferably, standard 1451 of the Institute of Electrical and Electronic Engineers. This standard defines plug and play smart sensors that utilize a Transducer Electronic Data Sheet that electronically describes the sensor being connected to the system. This standard allows each sensor to appear to be controlled as a software object by any computer on the network. This standards based sensor interface allows the incorporation of instruments of a variety of manufacturers. This also allows easy upgrading of existing sensors and instruments, and provides the ability to connect existing sensors to the system while allowing seamless integration of new sensors as they become available and certified for inclusion into the network. The network of the invention also allows for differentiated services for priority transfer of information.

The nodes 20 contain controllers 70 that are preferably programmed to prioritize tasks so that important and time critical information will have a higher priority on network transfers than routine information transmittal. This assures that the most important information is instantly incorporated into the common network-based operational picture. Further, the system of the invention allows information with different sensitivities to be simultaneously stored and processed in an information system with users having different security clearances, authorizations, and needs to know, while preventing users from accessing information for which they are not cleared, do not have authorization, or do not have a need to know.

The sensors are preferably independent of each other so that they can be replaced for repair or upgrading. An example of a sensor 61 for sensing chemical hazards is an ion mobility mass spectrometer. An example of a sensor 62 for sensing biological hazards is direct sampling ion trap mass spectrometer. An example of a sensor 63 for sensing nuclear hazards is an alpha/beta/gamma detector. Examples of sensors 64 for sensing radiological hazards include a proportional counter, a Geiger-Muller Counter and a Reiter-Stokes ionization chamber. An example of a sensor 65 for sensing explosive hazards is an ion mobility spectrometer or a direct sampling ion trap mass spectrometer. Preferably, the sensors are completely automated and have the capability to provide quantitative measurements as well as qualitative measurements. The sensors 61–65 can be provided with their own programmable controllers, not shown, and can be configured so that threshold limits can be set in detecting certain anomalies. For example, the threshold limit on the radiological sensor 64 for radioactive particles may be set at a level of 1 count per second, whereas the threshold limit on the biological sensor 61 for anthrax spores may be set at 0.00 parts per million (ppm). The term "anomaly", as used with respect to the present invention, refers to the detection of or existence of a substance or event in excess of a threshold limit by a sensor. The threshold limit can be zero for a particular substance, such as anthrax, so that detection of any amount of the substance will be an anomaly.

In addition to the sensors 61–65 for detecting anomalies of various types, the tower can also be provided with a meteorological sensor 66 for sensing such meteorological factors such as wind speed and direction, precipitation rate, and air temperature. Additional sensors, such as video cameras, earthquake detectors and Doppler radar, not shown, can also be used. One other optional sensor is a setting/environment sensor 67 used to gather data on any external factor needed for use of the system, such as a non-security threatening condition. For example, where the system of the invention is applied to provide a safe truck route for hazardous cargoes, the setting/environment sensor 67 can be configured to sense or detect traffic flow data, such as the speed or volume of traffic moving past one of the nodes 20 in the network 12, an expected delay in entering a crowded tunnel in a congested metropolitan area, an overloaded highway bridge, or a flooded river. Another example of a non-security threatening condition would be the level of ozone detected at the node 20. Also, the system and network of the invention can be used for tracking of ID-coded cargo containers, rail cars, trucks, planes, and ships. Further, the system of the invention can be used to control and monitor the movement of cargoes of hazardous material, as well as to oversee the safety and security of the route of transport of the cargo of hazardous material.

Figure 3:
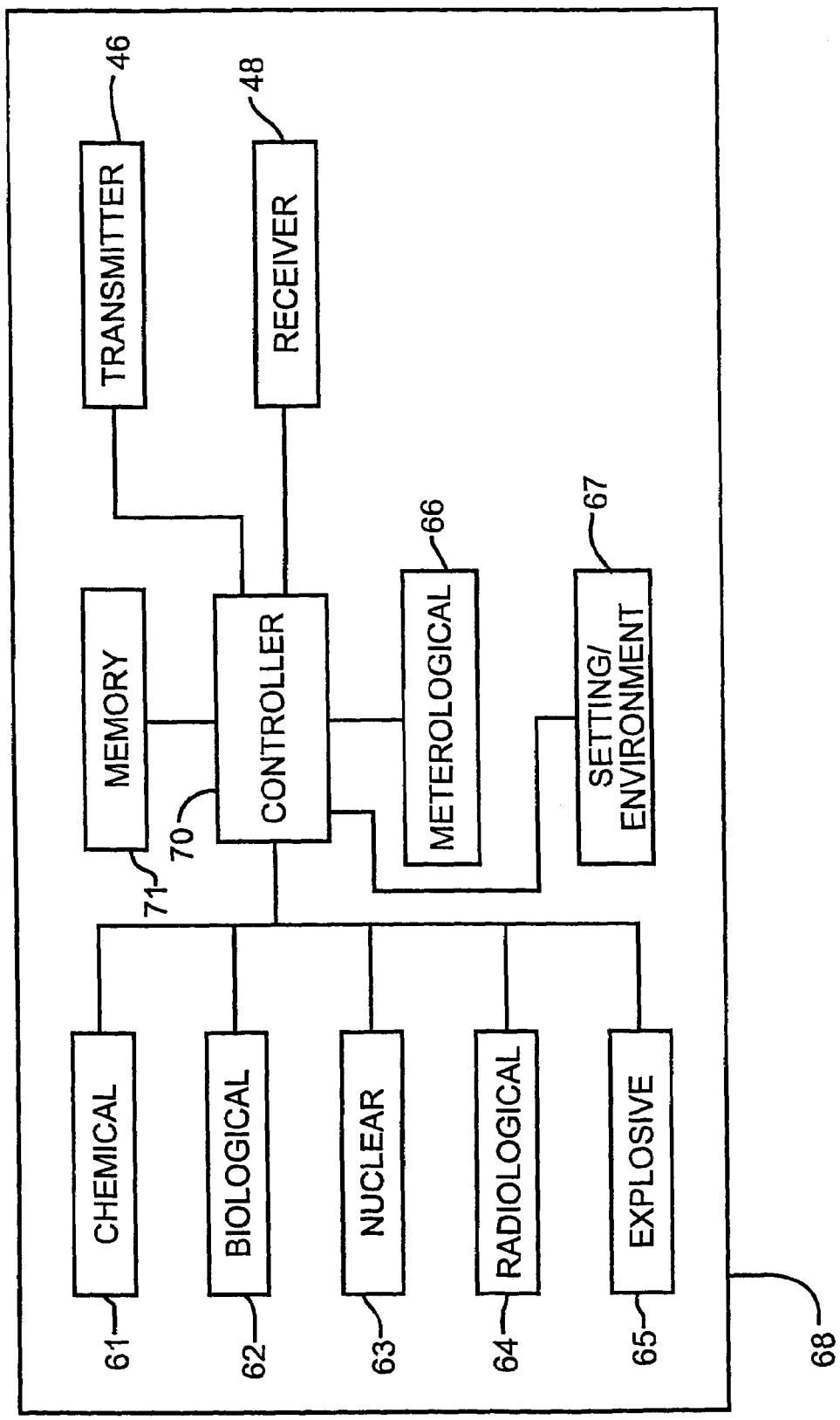
FIG. 3 is a schematic view of a control diagram for the node of the type illustrated in FIG. 2.

As shown in FIGS. 2 and 3, each of the nodes 20 has a control scheme 68 that includes a controller 70 connected to the sensors 60 associated with the node, and to the transmitter 46 and receiver 48. The controller 70 can be any type of information processor, such as a computer, suitable for processing the information received from the sensors, and from external sources via the receiver 48, based on stored information kept in a memory device 71 associated with the controller 70. The controller 70 includes operating software, preferably containing algorithms for computing responses to various scenarios and inputs.

Referring to FIG. 1, the system 10 of the invention is adapted to detect the presence of hazardous material resulting from an anomalous event, such as the detonation of a dirty bomb 72, with a wind direction indicated by the arrow 74. Although the dirty bomb 72 is shown as being outside the network 72 of the system 10, the system 10 would work in a similar manner if the dirty bomb were within the geographic area of the network 12. Eventually, the radiological sensor 64 at node 22 would sense the presence of the radiological fallout from the dirty bomb 72 at a level exceeding its predetermined threshold level. The controller 70 within node 22 would react to the detection of radiological material by sending notification to the adjacent nodes, i.e., nodes 21, 24 and 25 over the available links 34 or 32. These nodes would in turn send notification to additional nodes and eventually the notification will reach the emergency response system 36 and the control and command center 37. The controller 70 can be configured to automatically query each of its associated sensors 60 at the node 20, and to automatically broadcast a signal upon the detection of a hazardous substance exceeding a predetermined allowable level or limit. The signal from the node where the anomaly was initially detected could be a signal that includes a command to each subsequent node to pass the signal on to the emergency response system 36 and the control and command center 37.

In one embodiment of the invention, the controller 70 includes modeling software that enables the controller to predict movement and/or dispersion of hazardous material from an initial location where the hazardous material is detected to a subsequent, different location. The term "plume", as used with respect to the present invention, refers to a volume in a media, such as air, water or soil, that contains the hazardous component. The modeling software enables the controller to predict or determine a future migration path of the plume of the hazardous component; both in terms of location or distribution of the hazardous component at future times, and in terms of the quantification or concentration at various locations in the future. The controller 70 is programmed to analyze data from its associated sensors and form a prediction of a consequence of the data. More specifically, the modeling of plume movement and dispersion will take into account input from the relevant sensors 60 at the node 20 connected to the controller 70, including, to the extent pertinent, information from the meteorological sensor 66. For example, the controller would take into account wind speed and direction information from the meteorological sensor 66 when modeling the future plume of an airborne radiation hazard. This plume dispersion modeling will enable the command and control center 37 to inform or warn the populace potentially affected by the hazardous material, and will give the emergency response system 36 a more accurate view of the scope of the disaster or hazard. The integration of population demographics into the computer model will enable a prediction of the number of people potentially affected by a detected disaster. Also, integration of exposure effects on living organisms into the computer model enables decisions covering appropriate response actions. With a controller at each node 20 of the network 12, each of several controllers 20, upon the detection of the hazardous substance, can form its own determination of the future migration path of the plume, and can provide its own warning signals. Preferably, the modeling software in the various controllers 70 of the affected nodes 20 will be configured to reconcile differences associated with multiple computer-generated plume determinations.

It is advantageous to provide plume modeling from the controllers 70 in more than one node 20 because each controller could have different input values (e.g. detected concentration of the hazardous material, wind speed, wind direction, precipitation). For example, with reference to FIG. 1, if both node 21 and node 22 detect a hazardous substance, and if the controllers 70 of both nodes 21 and 22 develop a plume model, then the aggregate plume model or combination of the two plume models may provide a more accurate picture of the expected movement of the hazardous plume over time. Also, detections at multiple locations can be combined into a single collaboratively developed plume model. The plume model, or models, can be periodically or continuously upgraded as additional information (from any source) becomes available in order to increase the accuracy of the calculations. The controllers 70 can also be programmed to update the modeling by iterative sensing and analysis. The modeling software can be a customized program, and can be a version of software used for the U.S. military hazard prediction and assessment capability (HPAC). This is a government-owned software system that is publicly available with approval from the holding agency. Other plume dispersion models can be used.

In a specific embodiment of the invention, the controller is programmed to determine the point of origin or initial source of the hazardous material, i.e., to pinpoint the location of the hazardous material source, such as a bomb or other release. For example, with reference to FIG. 1, the detection of a hazardous substance by the sensors 60 of node 22, along with wind speed and direction information from the meteorological sensor 66, may be sufficient to calculate the location of the bomb 72. This will be advantageous because it will allow a better prediction of the consequences of the bomb, i.e., fallout. Further, it will assist law enforcement and investigative agencies in assessing the nature of the disaster, and in apprehending suspects. Also, if the disaster is something in the nature of a spill or leak of hazardous material, pinpointing the source may enable a swifter cutting off of the flow or containment of the hazardous material, such as, for example, where a railcar has derailed in a remote location and has spilled hazardous material which enters the airstream or a water course.

In a preferred embodiment of the invention, the controller 70 of each of the nodes 20 in the network 12 is programmed to periodically query the controller 70 in the next nearest node or nodes 20. This query could merely consist of an inquiry as to the readiness of the next nearest node to accept signals from the first node. For example, with reference to FIG. 1, the controller 21 could periodically query the controller of node 22 to verify that node 22 is ready to accept signals and can be used as part of a path from node 21 to the emergency response system 36 and the command and control center 37. The query could also be a request for the second node 22 to confirm that all its sensors 60, its transmitter 46 and receiver 48, and its power supply are in readiness for action. The query from one node 60 to the next can be programmed to occur infrequently, such as once per hour, or very frequently, such as once each second, or any other suitable time period. The controller 70 of node 21 can be programmed to query the next nearest nodes 22, 23 and 24 at an infrequent interval, such as, for example, every 15 minutes as long as there is no detection of a hazardous substance by any of its sensors 60 and as long as there is no notification from an adjacent node 22, 23 and 24, that a hazardous substance has been detected. On the other hand the controller can be programmed to send status queries with short intervals when there is an indication from any source that an anomaly has been detected or sensed. In this respect the controller is programmed to change the intervals of status inquiries, i.e., shorten or lengthen the intervals.

The sensors 60 can be programmed or configured to periodically or continually provide a readiness signal to the controller 70. In order to conserve power, the sensors 60 may also be configured to take samples only periodically rather than continuously. In some cases the sensors 60 may be configured for the sensing of multiple substances or may have multiple levels of testing. For example, the sensor may be configured to conduct a first level test for a particular biohazard with the first level test being merely a gross screening, a second level test for a more comprehensive analysis, and a third level test with detailed automated test steps to more particularly hone in on the substance in question. The controller can be configured to require the sensor to conduct the second and third level of testing when there is a detection of an anomaly with the first level test, or when there is an indication from another node 20 that an anomaly has been detected or sensed. Further, the controller can be programmed to lower the threshold or otherwise adjust the threshold for the sensors 60 associated with the node upon the detection of an anomaly. The controller can also be programmed to test and recalibrate a sensor to assure its measurement accuracy.

One of the advantages of the communication between adjacent nodes 20 is that the controller 70 of one node 20 can signal an adjacent node 20 to carry out different functions. For example, if an anomaly has been detected based on a specific test by a specific sensor 60, then the controller 70 can be programmed to send a signal to its next nearest nodes 20 (or to any number of nodes) for each of the analogous sensors 60 to conduct its own test for the detected substance. The testing by the second node would be used to corroborate the findings of the first node. The controller 70 of the first node 20 could be programmed to delay sending a general signal to the emergency response system 36 and the control and command center 37 until there is corroboration from a second node. The ability of the system to view a disaster from any of several nodes is beneficial by giving the system different perspectives. Further, the controllers 70 can be configured so that each controller, when an anomaly is detected, is programmed to collaborate with the controller of an adjacent node use information from the controller of the adjacent node in assessing a response to the anomaly. The collaborating can be in the form of sharing data, retrieving information from an adjacent or next nearest controller, or collaboratively working with another controller to develop a predictive analysis. Also, the controller can be programmed to assess the relevant data available to it and then make a determination as to whether to send data in an unprocessed form or to process the information before sending information.

In one embodiment of the invention, each controller is programmed to determine whether or not it has a clear, available communication link to the emergency response system 36 and the control and command center 37. This can be accomplished in several ways. The controller 70 can be programmed to query the next nearest node 20 to test the link between the two nodes. As part of that query, the controller of the first node can be programmed to inquire of the controller of the second node if the second node has a clear link to a third node, or, directly or indirectly, to the emergency response system 36 and the control and command center 37. These queries can continue until the controller of the first node finally gets a signal confirming that a complete link or path to the emergency response system 36 and the control and command center 37 is available. In this sense, the nodes 20 act as relays for signals from distant nodes to a target communication destination. The controller of a second node can be programmed to receive signals from an adjacent first node and transmit the signal to a third node. Optionally, the controller of the second node can amplify or modify the signal before transmitting the signal to the third node. Since there is a link 32 or 34, as well as possibly satellite links, between adjacent nodes 20, it can be seen that there are many possible routes for signals from one node 20 to reach the emergency response system 36 and the control and command center 37. In the event that one or more of the links is destroyed or otherwise rendered inoperable, then the network system 10 is designed to secure an alternate path for each of the nodes. Therefore, upon a finding in response to a query of an adjacent node 20, that the adjacent node or the communication link to the adjacent node is inoperable, the controller 70 is programmed to transmit data over a link to a different node. Therefore, it can be seen that the system of the invention includes a high level of reliability and survivability. In a particular aspect of the invention, when there is a failure of a part, or whole, of the local network, the controller can be programmed to reconfigure itself to communicate with, and become apart of, another network within its communication range.

The controller 70 can be programmed so that it has a primary or first choice adjacent node, or alternatively the controller 70 can periodically query several of or all of its adjacent nodes to assess the then-current available paths along the links to reach the emergency response system 36 and the control and command center 37, or any other desired location. Also, it is possible for direct links to be established between any given node 20 and the emergency response system 36 and the control and command center 37, thereby obviating the need for communicating via the remainder of the network 12 for that particular node. Further, although the primary mode for communication from any particular node 20 to another node may be an RF signal, in one embodiment of the invention the controller 70 of the node is programmed to switch to at least one different mode of communication, i.e., via satellite 54 or hardwire 56, upon the detection of a failure of the primary mode of communication. In this respect, the network 12 has a self-healing capability, and a redundancy of communications links is provided.

The controllers 70 can be programmed to send commands to adjacent and next nearest nodes. For example, each controller can be programmed to send a command to run a specific test. The controllers can be programmed to send a command to modify a threshold level for a test, or to send a command to transmit additional data. The controllers can be programmed to send a command to change the frequency of a routine specific test, or to send a command to send the status of calibration of a sensor. Further, the controllers can be programmed to send a command to query identification data (date of manufacture, model number, etc.) of a sensor, to send a command to change the functionality of an entire node. Also, the controllers can be programmed to send a command to change the transmittal rate of data, and can be programmed to send a command to perform predictive analysis. Further, the controllers can be programmed to send a command to become a data storage facility, and can be programmed to send a command to query another node.

In one embodiment of the invention the controllers 70 of the nodes have a significantly sized memory 71 to be able to store data from the associated sensors 60 and various other inputs. Further, each controller 70 is periodically sending signals to the adjacent or next nearest nodes 20 with some or all of this data, and the controller 70 of the receiving node is programmed to store the data in the memory 71 of its controller 70. Therefore, if a node is destroyed or otherwise rendered inoperable, such as for example by an earthquake or an explosion, the next nearest nodes 20 will have stored in their memories 71 the data from the destroyed node.

One of the advantages of the use of controller 70 in each of the nodes 20 is that the controllers can be occasionally supplied with signals to change the operation of the node, upgrade the software in the controller, or to add a new function or new commands. For example, if a new type of radiological sensor 64 is added to each of the nodes 20 in the network 12, the software for controlling the new sensors 64 and for interpreting the signals from the new sensors can be downloaded or otherwise supplied to the controllers 70 of each of the nodes. Other examples of input to the controllers 70 is providing commands to modify the threshold limits of various sensors, providing commands to calibrate the sensors 60 and other equipment, and conducting preventative repair and maintenance. Commands to the controllers 70 in the nodes can come from any appropriate source, such as the command center 37, and can be sent via any suitable link, such as a radio wave link 32, a hard wire link 34 or a satellite link. Alternatively, the upgrade or new instructions can be downloaded manually at the node. Further, the controller can be programmed to change its operation upon the occurrence of any one or more event in the group consisting of the detection of an anomaly, the destruction of a communication link to an adjacent node, a loss of power from a primary source of power, a loss of controller capability, a decrease in capability of a processor, a decrease in the capability of memory storage, and a command from another node. One example of a change in operation of a node is programming the controller so that the node adopts a new function, such as, for example, changing the type of test run by a sensor, running a self-calibration test, or changing the location of the node. Further, signals or commands to a controller to change its operation, including changing the function of the node, can be given by another node. Another advantage of the use of a controller 70 in each of the nodes is that there can be a comprehensive interpretation and analysis of the detection data from the sensors 60 prior to initiation of a communication from the node to other nodes or to the emergency response system 36 and the control and command center 37. Therefore, the signal can contain a comprehensive analysis rather than mere raw detection data. For example, instead of broadcasting merely the fact of a detection of an anomaly, such as, for example, an anthrax substance detected by the biological sensor 62, the controller can be programmed to query adjacent nodes, and provide a prediction of plume movement for the anthrax based on the responses from the adjacent nodes and the input from the meteorological sensor 66. Therefore, the communication from the nodes will be much more informative than would otherwise be the case.

The controller can be programmed to provide signals of a specific nature in response to specific anomalies. For example, the controller can be programmed to automatically send signals to an audible tornado alarm, located either at the node or in a different location, in the event that a Doppler radar sensor detects a situation indicating a tornado. Another example is that the controller can be programmed to automatically send signals to a process control apparatus, such as the controls for shutting down a nuclear reactor in the event that a serious explosion is detected by the explosive sensor 65.

In a specific embodiment of the invention, the controller 70, acting in response to information sensed by its sensors 60, or information from another source, sends a signal to a sensor deployment mechanism which acts to deploy additional sensors to new locations not originally provided with sensors. The sensors could be deployed outwardly or inwardly. The deployment mechanism could be fleet of mobile sensor trucks, not shown, that are dispatched to travel to the site of interest for further testing or other action with respect to the detected anomaly. In another example, there could be a drone, or a low level, sensor-deploying missile or rocket, not shown, that projects robot sensors to the area of interest. Deployment of the sensors could involve moving sensors up or down a cell tower. Also, the controllers can be programmed to move the entire node, or to send a signal to an adjacent node for the adjacent node to move. Referring to FIG. 1, once the node 22 detects the radioactive fallout from the bomb 72, a sensor-deploying low-level rocket could be directed to drop additional sensors on the ground in the vicinity surrounding the origin point of the bomb 72, as determined by the plume modeling software. The purpose of the additional sensors would be to provide a more detailed assessment of the anomaly. Deployed sensors could be provided with a positioning system, such as a Global Positioning System.

The network 12 of nodes 20 connected by the links, 32, 34 lends itself to a dual use of the apparatus, wherein not only does the network 12 support the system of detecting anomalies for safety and security purposes, but also supports a non-security function. For example, if a node 20 is placed near a major highway, the network 12 can be used to monitor traffic flow and report the traffic flow data to the emergency response system 36, or, alternatively, to some other interested party, such as to the media for reporting current rush hour traffic information. For this purpose one of the sensors 60 at the node 20 might be a video camera. Another possible non-security use is the use of air quality monitors. In a particular embodiment of the invention, some of the data from the sensors 60 can be directed by the controllers 70 to specific private end users. For example, an individual with an asthma condition could purchase access to ozone level or smog data from the meteorological sensor 66 at various nodes 20 in the vicinity of the individual's residence. Also, a delivery company or taxi company could purchase traffic data from nodes equipped with traffic monitoring sensors.

While the examples of networks 12 illustrated so far have been limited to nodes produced at spaced apart towers, such as cellular phone towers 40, there are many other types of networks and possible sites for nodes 20 that can be used in conjunction with the system of the invention. The system of the invention can be used to monitor lakes, rivers, reservoirs and other bodies of water to ensure their security and to provide monitoring data. Pipelines, bridges and canals can also be monitored to detect anomalies affecting the security of the structure as well as the safety of the surrounding population.

Mobile nodes can also be used to form a network that can be part of a system according to the invention. For example, the mobile nodes can be arranged on ships, railcars, busses, taxis, emergency vehicles, and vehicles for utility companies. Advantageously, the mobile nodes will include a global positioning device or similar positioning device for an exact determination of the location of the mobile node. Also, mobile nodes can be positioned temporarily in specific locations for particular purposes. For example, mobile or portable nodes can be set up temporarily in sporting venues, such as at the Olympic Games or at NASCAR events. Also, mobile nodes can be carried by people, such as by soldiers on a battlefield, or by first responders or rescue personnel at the site of a disaster.

Figure 4:
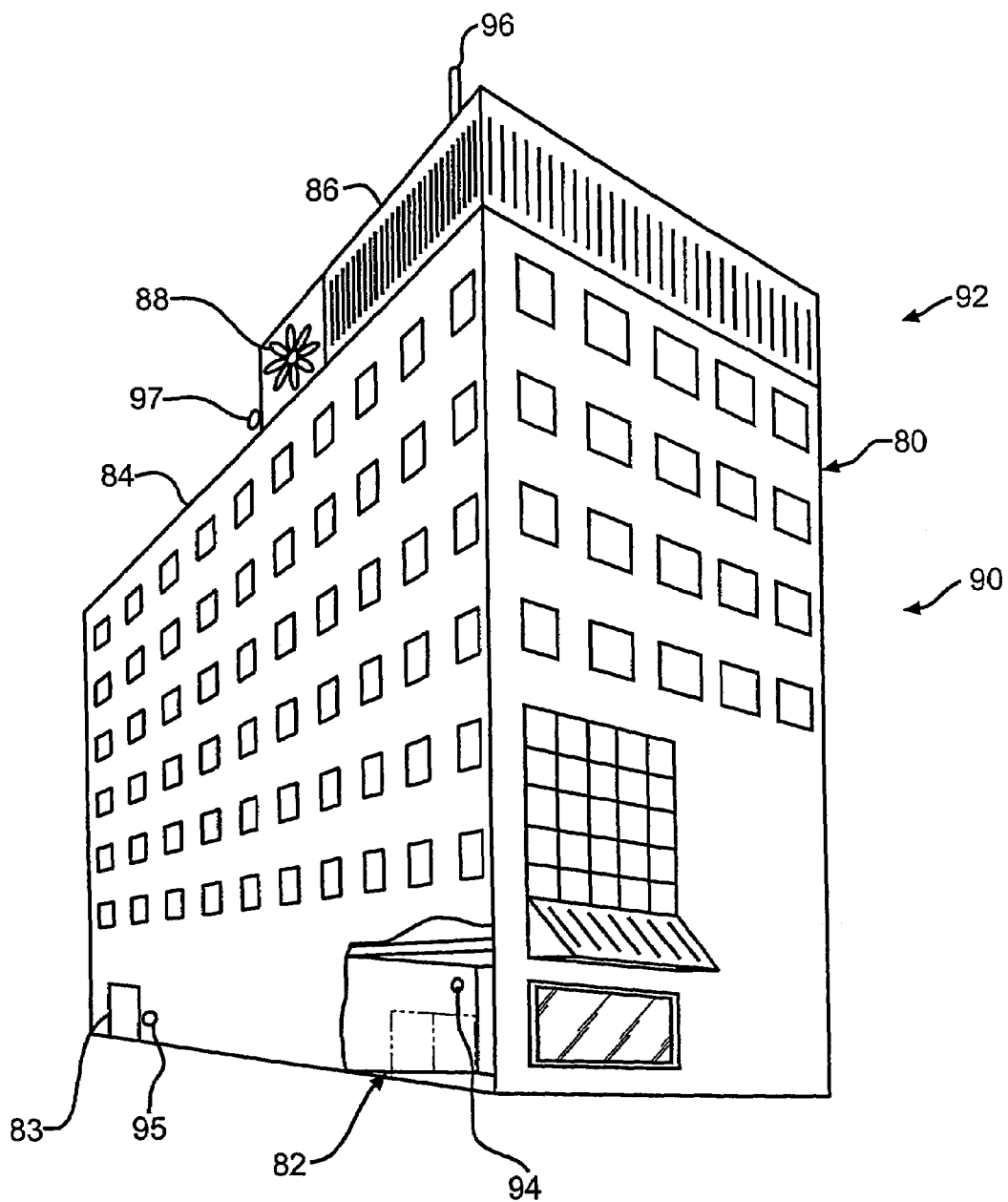
FIG. 4 is a partially cut-away schematic view in perspective of a building equipped with the system of the invention.
Figure 5:
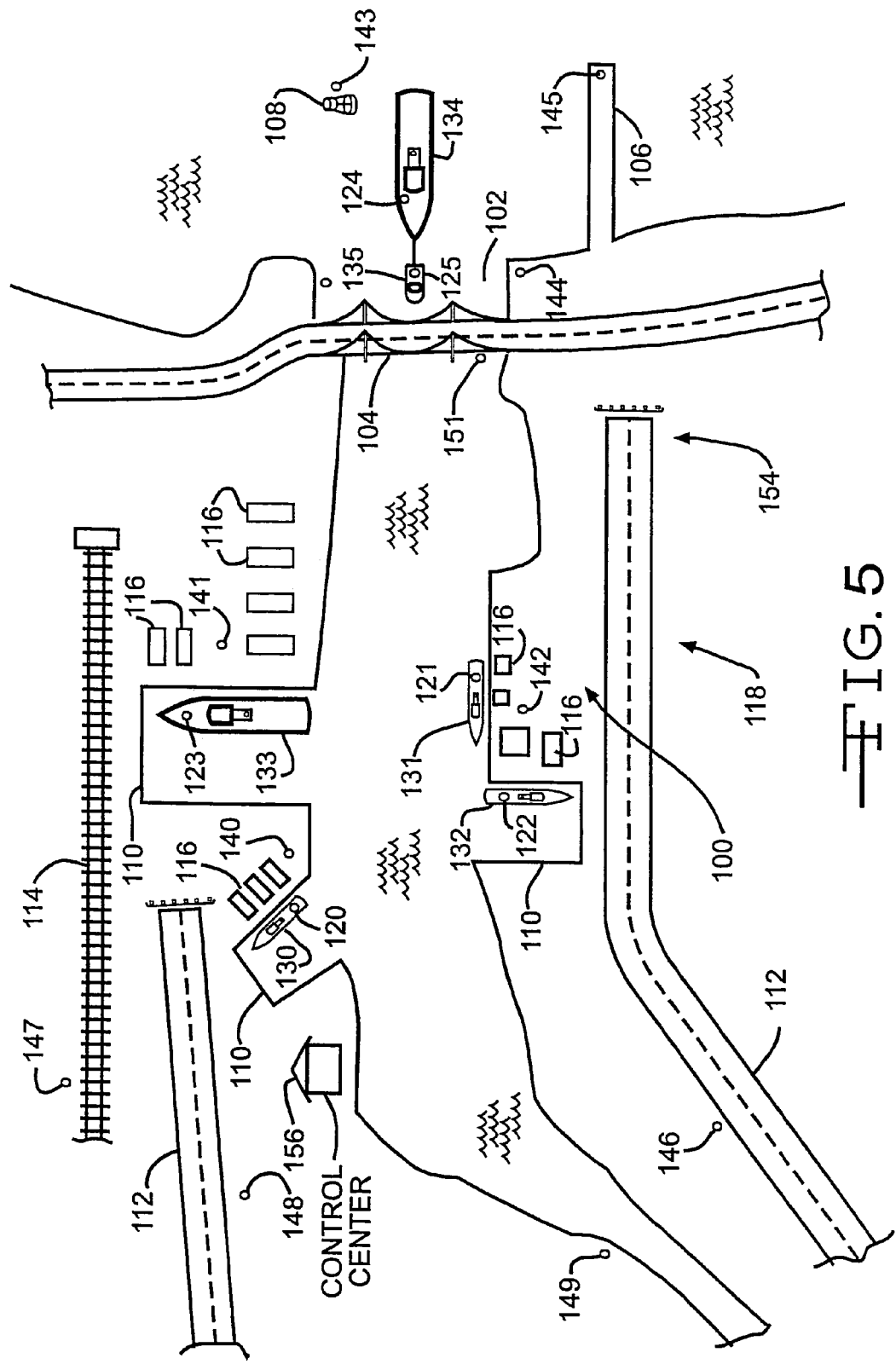
FIG. 5 schematically illustrates a shipping harbor provided with a system of detecting anomalies and monitoring the movement of shipping containers according to the invention.
Figure 6:
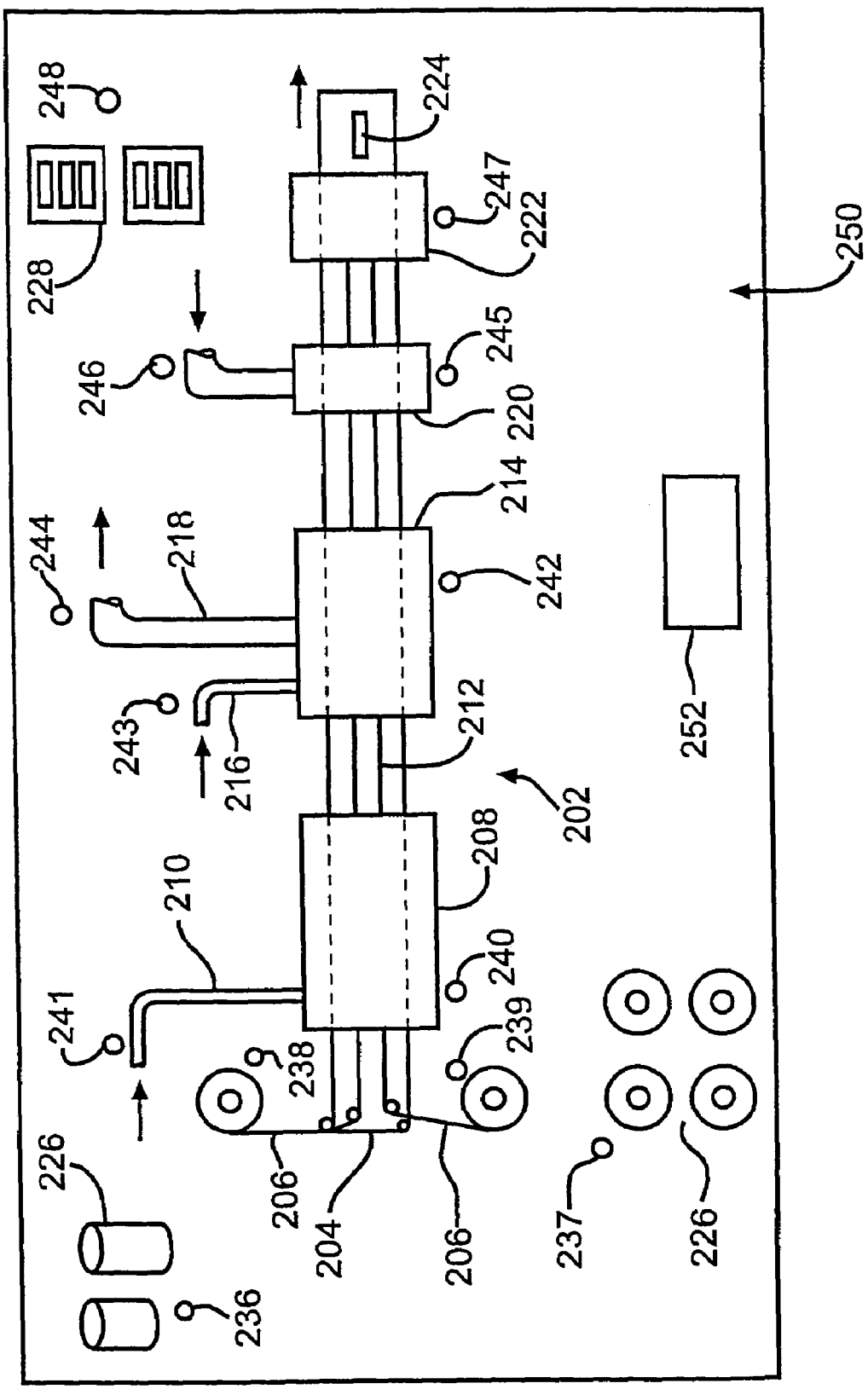
FIG. 6 is a schematic plan view of a manufacturing facility having a system of process control according to the invention.

Individual buildings as well as complexes of buildings can be provided with networks of nodes according to the present invention. Examples include airports, rail and subway stations, shopping malls, sports stadiums, government buildings, monuments, hospitals, college campuses, power plants and industrial sites. As shown in FIG. 4, an office building 80 can include a main entrance 82, a rear entrance 83 and a roof 84. Positioned on the roof is a ventilation system 86 that includes an air intake fan 88. The system 90 of the invention includes a network 92 of nodes, including specifically (and schematically) a node 94 at the main entrance 82, a node 95 at the rear entrance 83, a node 96 on the roof 84, and a node 97 at the air intake fan 88. Additional nodes can also be used. Preferably, each of the nodes 94–97 includes multiple sensors, a transmitter and a receiver in a manner similar to that shown in FIG. 2. Another sensor for the nodes 94–97 can be fire and smoke detectors, not shown. One of the sensors on the nodes can be a video camera for optical detection of hazards by a scanner, or for visual detection by security personnel in a different location in the building 80. The communication among nodes 94–97 can be via any suitable connection, such as wireless connections or hardwire connections. The network 92 of nodes can be linked via any suitable connection to an emergency response system and a control and command center, both not shown. Also, the network of nodes can be connected to and incorporated into a building security system, not shown, for the building 80. The controllers of the nodes, such as nodes 96 or 97, can be programmed to send a signal, in the event of a detection of an airborne hazardous substance by the nodes, to the fan 88, causing the fan 88 to shut down to avoid drawing the airborne contaminants into the building's ventilation system.

EXAMPLE

An integrated hazard detection and assessment system underwent field testing at cellular communication towers in Tennessee. The field test included a Block II chemical/biological mass spectrometer (CBMS) for detection of airborne chemical agents in the mail room of the City-Center building in Knoxville, Tenn., a direct sampling ion trap mass spectrometer for detection of chemical agents in air and compounds in water in Chattanooga, Tenn., and a Block II CBMS for detection of airborne chemical and biological agents in Nashville, Tenn.

All sensors were networked over an existing conventional phone line system to a Central Command Center at the State of Tennessee Office of Homeland Security in Nashville, Tenn. Detection information and local meteorological data were input to the U.S. military hazard prediction and assessment capability (HPAC) for plume prediction. The results of the field test performed are summarized in the table below:

TABLE 1

Detection of Airborne and Waterborne Chemicals

| Agent | Detection and Identification Time (Sec) | Total Elapsed Time of Test (Sec)a |
|---|---|---|
| Air Tests | | |
| Sarin simulant (methyl salicylate) | 4–25 | 39–96 |
| Anthrax simulant [*Bacillus globigi* (BG)] | 29–40 | 64–77 |
| Water Tests | | |
| Chloroform | 1.7–2.0 | b |

A Total elapsed time from injection in the sensor to detection, identification, and hazard plume prediction at the command center.
B HPAC water plume dispersion modeling was not performed for chloroform in water.

As shown above, the time for detection and identification of the simulated airborne chemical threat (methyl salicylate), simulated airborne biological threat (*Bacillus globigi*) and waterborne chemical threat (chloroform) was less than or equal to 40 seconds. The three sensing stations all transmitted the detection and identification information to the Central Command Center for plume analysis. The total elapsed time for the detection, identification and hazardous plume prediction for the airborne chemical and biological simulated threats at the Central Command Center was less than or equal to 96 seconds.

During a separate test, the telephone connections were placed in standby j node (no open lines) and a Sarin gas simulant was sprayed into the sensors at the three locations contemporaneously. The system was then required to automatically call the Command Center and convey the sensor data. The Central Command Center successfully received sensor data without the loss of information from the simultaneous alerts at the three remotely located sensor locations. Although three sensor stations were used in the test performed, the invention may be practiced with hundreds or thousands of remotely locate sensor stations, such as across an entire country.

FIG. 5 illustrates a shipping harbor, indicated at 100, that includes a harbor mouth 102, a bridge 104, a jetty 106 and a harbor light 108. The harbor 100 includes slips 110, access roads 112, and rail lines 114. Much of the cargo being moved onto and from the ships is in the form of shipping containers 116. A system 118 for detecting anomalies includes a plurality of nodes 120–125 that are positioned on ships 130–134 and a tugboat 135. Additional nodes 140–150 are positioned at strategic points throughout the harbor, and a node 151 is located on the bridge 104. The nodes 120–125, 130–135 and 140–151 are linked together to form a network 154, which can also be connected to a harbor control center 156, as well as to an external emergency response system and control and command center similar to the emergency response system 36 and the control and command center 37 shown in FIG. 1. The links can be hardwire links, wireless links such as RF links or satellite links, or any other suitable means of connecting the nodes.

The nodes 120–125, 130–135 and 140–151 include sensors, which can be similar to those described above with respect to FIGS. 2 and 3, for detecting various anomalies, so that the system 116 of the invention can detect anomalies in and about the harbor 100, and respond in a manner suitable for the situation, such as in a manner described in the discussion above of FIGS. 1–3. For example, if the ship 134 is moving in a manner possibly leading to a collision with the bridge 104 or the jetty 106, sensors on nodes 143, 144, 145, 151, 124 and 125 can detect this anomaly and the appropriate controllers can provide signals to the ship captain of the ship 134. In addition to having the capability for detecting anomalies, the system 118 can also provide a valuable additional security and business function by monitoring the movement of the containers 116. The system 118 of the invention can be used for real time tracking of the security and status of the shipping containers 116 entering and leaving the harbor area 100, whether by rail, road or ship. Each cargo container 116 can be provided with an identification tag, not shown, preferably having an electronic chip for identification purposes. Some or all of the nodes 120–125, 130–135 and 140–151 can include sensors, not shown, for detecting the identification tags of the cargo containers. It is to be understood that systems similar to system 100 can be established to handle other types of transportation circumstances. For example, a similar system could be used to monitor and control truck transportation at local, regional or national trucking centers or truck weigh/inspection stations according to the invention. Likewise, a similar system could be used to monitor and control rail transportation. Further, systems according to the invention can be international in scope, with nodes in ports, rail or trucking centers in other countries.

FIG. 6 illustrates a factory 200 that includes a continuous molding process having a control system according to the invention. Although the process disclosed is a molding process, it is to be understood that the principles of process control according to the present invention can be incorporated into many different process control situations, such as, for example, a process control system for an oil field. As shown in FIG. 6, the molding process is carried out on a continuous molding machine 202 which includes a continuous conveyor 204. At the front end of the machine 202 reinforcement material 206 is continuously supplied to molding equipment 208. Liquid resin material is supplied to the molding equipment 208 via conduit 210, and a continuous molded part or blank 212 is formed. The continuous blank 212 is then conveyed to a paint booth 214, where paint is supplied by a paint supply line 216, and paint fumes are removed by exhaust duct 218. The painted continuous blank is then passed through an oven 220 for paint curing. The final station is a cutter 222 where the blank 212 is cut into individual parts 224. Raw material inventory 226 is stored at the front end of the molding machine 202, and the inventory 228 of finished parts 224 is stored at the terminal end of the molding machine 202.

The control system of the invention includes a plurality of nodes 236–248, each having one or more sensors, not shown, for detecting process conditions, or anomalies, or both process conditions and anomalies. Substantially all of the nodes 236–248 have a controller, preferably similar to the controller 70 disclosed in FIGS. 2 and 3. At node 240 the sensors are configured to monitor process conditions within the molding equipment 208. Node 241 senses information regarding the flow of resin to the molding equipment. This information could include, for example, the flow rate of the resin through the conduit 210, the temperature of the resin, and the viscosity of the resin. Node 242 senses the level of various process parameters involved with the painting process in the paint booth 214. Nodes 245 and 247 monitor the curing oven 220 and cutter apparatus 222, respectively, in a similar manner. The nodes 236–248 are connected by wireless links to form a network 250, although any suitable type of linking, such as hardwire links (including optical cable), can be used. The control system of the invention preferably includes a master controller, indicated schematically at 252, that is linked to each of the nodes, either directly, or indirectly via another node.

In view of the above description, it can be seen that the system of the invention provides a network or common data highway for data communication from a multiplicity of sensors. The system of the invention allows the real-time detection, identification and assessment of chemical, biological, radiological, nuclear, and explosive threats. The network infrastructure allows distributed access with multi-level security, information analysis, information management and a common network-based operational picture. The system is designed to assure an ultra-high level of reliability, survivability and security. The architecture is scalable across state, local, and federal governments. This system is capable of using commercial standards to provide interoperability, maintainability, controllability, and upgradeability over a wide range of sensors and communication network infrastructure.

The principle and mode of operation of this invention have been described in its preferred embodiments. However, it should be noted that this invention may be practiced otherwise than as specifically illustrated and described without departing from its scope.

The invention claimed is:

1. A system for detecting the occurrence of anomalies comprising:
a plurality of spaced apart nodes, with each node having adjacent nodes, each of the nodes having one or more sensors associated with the node and capable of detecting anomalies, and each of the nodes having a controller connected to the sensors associated with the node; and
communication links between adjacent nodes, whereby the nodes form a network;
wherein each controller is programmed to query its adjacent nodes to assess the status of the adjacent nodes and the communication links.

2. The system of claim 1 wherein each controller is programmed to transmit data over the links, and, upon a finding in response to a query of an adjacent node, that the adjacent node or the communication link to the adjacent node is inoperable, the controller is programmed to transmit data over a link to a different node.

3. The system of claim 1 in which each controller has memory storage, and each controller transmits data to an adjacent node, wherein the controller of the adjacent node stores the transmitted data in the memory of the adjacent node.

4. The system of claim 1 in which each controller is programmed to send commands to an adjacent node upon the detection of predetermined anomalies by its associated sensors.

5. The system of claim 1 in which each controller, when an anomaly is detected, is programmed to query its adjacent nodes to assess detection by the adjacent nodes, and upon corroboration of the anomaly by an adjacent node, the controller is programmed to transmit a signal indicative of the detection of the anomaly.

6. The system of claim 1 in which each controller, when an anomaly is detected, is programmed to collaborate with the controller of an adjacent node use information from the controller of the adjacent node in assessing a response to the anomaly.

7. The system of claim 1 in which at least one of the associated sensors of a node is configured to sense a condition related to a security threat, and at least one of the sensors of the node is configured to sense a non-security threatening condition.

8. The system of claim 1 in which each controller is programmed to determine a point of origin of a detected anomaly.

9. The system of claim 1 in which each controller is programmed to change its operation upon the occurrence of any one or more event in the group consisting of the detection of an anomaly, the destruction of a communication link to an adjacent node, a loss of power from a primary source of power, a loss of controller capability, a decrease in capability of a processor, a decrease in the capability of memory storage, and a command from another node.

10. The system of claim 1 in which each controller is programmed to deploy sensors outwardly from the node in response to the detection of an anomaly.

11. A system for detecting the occurrence of anomalies comprising:
a plurality of spaced apart nodes, with each node having adjacent nodes, each of the nodes having one or more sensors associated with the node and capable of detecting anomalies, and each of the nodes having a controller connected to the sensors associated with the node; and
communication links between adjacent nodes, whereby the nodes form a network;
wherein each controller is programmed to send commands to one or more adjacent nodes upon the detection of predetermined anomalies by its associated sensors, with one of the commands being a command to run a specific test.

12. The system of claim 11 in which each controller is programmed to send a command to modify a threshold level for a test.

13. The system of claim 11 in which each controller is programmed to send a command to transmit additional data.

14. The system of claim 11 in which each controller is programmed to send a command to change the frequency of a routine specific test.

15. The system of claim 11 in which each controller is programmed to send a command to send a status of calibration of a sensor.

16. The system of claim 11 in which each controller is programmed to send a command to query identification data of a sensor.

17. The system of claim 11 in which each controller is programmed to send a command to query another node.

18. A system for detecting the occurrence of anomalies comprising:
a plurality of spaced apart nodes, with each node having adjacent nodes, each of the nodes having one or more sensors associated with the node and capable of detecting anomalies, and each of the nodes having a controller connected to the sensors associated with the node; and
communication links between adjacent nodes, whereby the nodes form a network;
wherein at least one of the associated sensors of a node is configured to sense a condition related to a security threat, and at least one of the sensors of the node is configured to sense a non-security threatening condition.

19. The system of claim 18 in which the sensor configured to sense a non-security threatening condition is a sensor configured to sense a meteorological condition.

20. The system of claim 18 in which each controller has memory storage, and each controller transmits data to an adjacent node, wherein the controller of the adjacent node stores the transmitted data in the memory of the adjacent node.

21. The system of claim 18 in which each controller is programmed to send status queries to adjacent nodes at periodic intervals, and is programmed to change the intervals when there is an indication that an anomaly has been detected.

22. The system of claim 18 in which each controller is programmed to send commands to an adjacent node upon the detection of predetermined anomalies by its associated sensors.

23. A system for detecting the occurrence of anomalies comprising:
- a plurality of spaced apart nodes, with each node having adjacent nodes, each of the nodes having one or more sensors associated with the node and capable of detecting anomalies, and each of the nodes having a controller connected to the sensors associated with the node; and
- communication links between adjacent nodes, whereby the nodes form a network;
- wherein each controller, when an anomaly is detected, is programmed to query its adjacent nodes to assess data collected by the adjacent node; and
- wherein each controller is programmed to determine a point of origin of a detected anomaly using, in part, input from an adjacent node.

24. The system of claim 23 in which each controller has memory storage, and each controller transmits data to an adjacent node, wherein the controller of the adjacent node stores the transmitted data in the memory of the adjacent node.

25. A control system for monitoring process conditions comprising:
- a plurality of spaced apart nodes, with each node having adjacent nodes, each of the nodes having one or more sensors associated with the node and capable of assessing process conditions, and each of the nodes having a controller connected to the sensors associated with the node; and
- communication links between adjacent nodes, whereby the nodes form a network;
- wherein each controller is programmed to query its adjacent nodes to assess the status of the adjacent nodes and the communication links.

26. The system of claim 25 wherein each controller is programmed to transmit data over the links, and, upon a finding in response to a query of an adjacent node, that the adjacent node or the communication link to the adjacent node is inoperable, the controller is programmed to transmit data over a link to a different node.

27. The system of claim 25 in which each controller has memory storage, and each controller transmits data to an adjacent node, wherein the controller of the adjacent node stores the transmitted data in the memory of the adjacent node.

28. The system of claim 25 in which each controller is programmed to send status queries to adjacent nodes at periodic intervals, and is programmed to change the intervals when there is an indication that an anomaly has been detected.

29. The system of claim 25 in which each controller is programmed to send commands to an adjacent node upon the detection of predetermined anomalies by its associated sensors.

30. The system of claim 25 in which each controller, when an anomaly is detected, is programmed to query its adjacent nodes to assess detection by the adjacent nodes, and upon corroboration of the anomaly by an adjacent node, the controller is programmed to transmit a signal indicative of the detection of the anomaly.

31. The system of claim 25 in which at least one of the associated sensors of a node is configured to sense a condition related to a security threat, and at least one of the sensors of the node is configured to sense a non-security threatening condition.

32. The system of claim 25 in which each controller is programmed to determine a point of origin of a detected anomaly.

33. The system of claim 25 in which each controller is programmed to change its operation upon the occurrence of any one or more event in the group consisting of the detection of an anomaly, the destruction of a communication link to an adjacent node, a loss of power from a primary source of power, a loss of controller capability, a decrease in capability of a processor, a decrease in the capability of memory storage, and a command from another node.

* * * * *